Aug. 13, 1935.  J. E. PAPIN  2,011,114
METHOD OF WINDING AN ELECTRIC MACHINE
Filed July 22, 1933
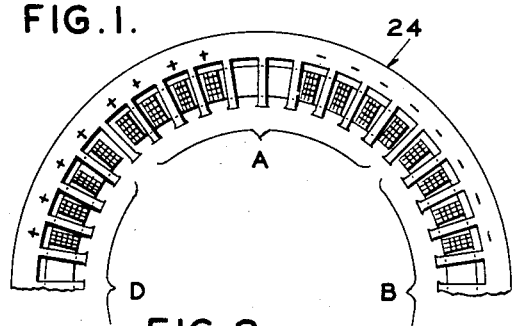
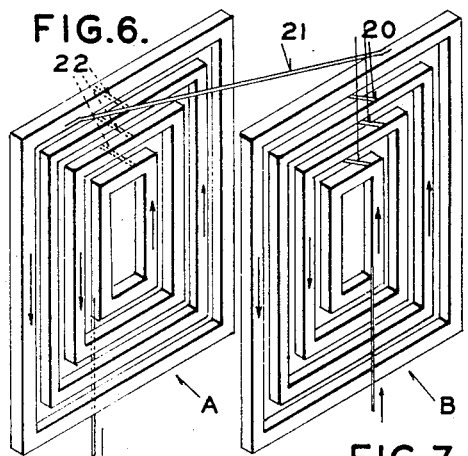
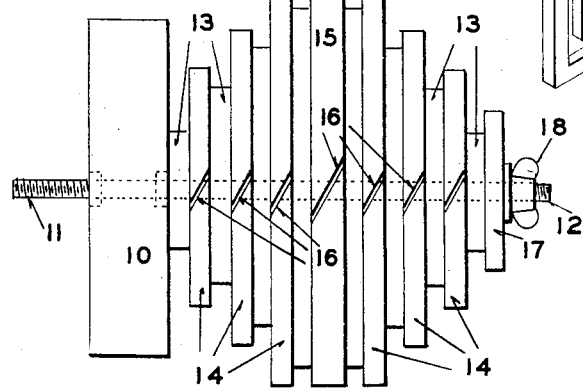
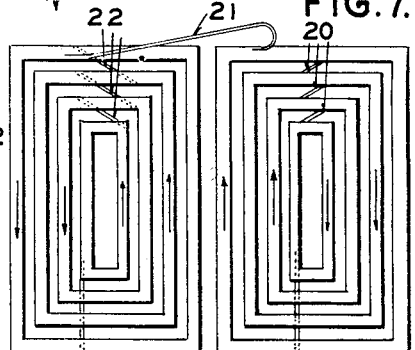
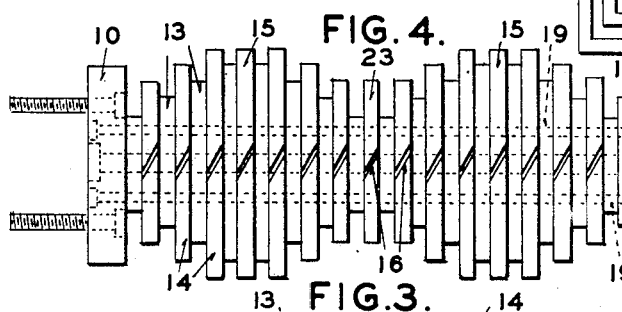
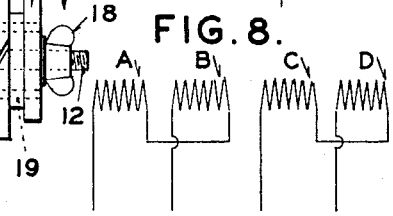
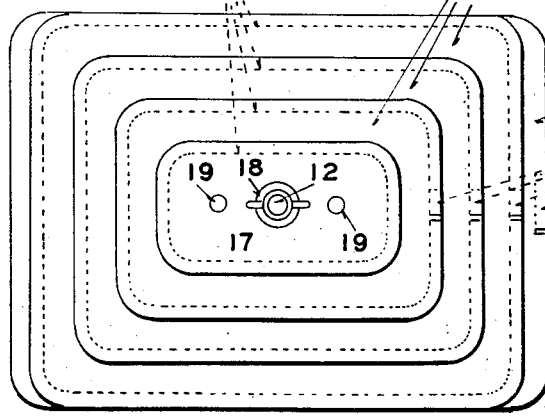
Inventor
J. E. Papin
By E. G. Huffman
Att'y.

Patented Aug. 13, 1935

2,011,114

UNITED STATES PATENT OFFICE 2,011,114

METHOD OF WINDING AN ELECTRIC MACHINE

Joseph Edward Papin, St. Louis, Mo., assignor to Wagner Electric Corporation, St. Louis, Mo., a corporation of Delaware Application July 22, 1933, Serial No. 681,800

3 Claims. (Cl. 171—252)

In the usual method of winding coils for the stators of electrical machines, the coil for each pole, usually comprising a plurality of nesting sub-coils placed in separate slots, is formed of an independent wire, the coils after assembly being joined between poles by soldering. Such soldered joints are objectionable as they may result in poor contact with consequent high resistance and liability to melting. Furthermore, the soldering and taping of the joints involves time and expense and produce bulky and unsightly connections.

The object of the present invention is to provide means for winding an electrical machine having a plurality of poles, the coils being formed from an integral conductor and applied to the poles to produce alternating polarities without their connection being severed, thus dispensing with soldered joints between the poles and so avoiding the objectionable features above referred to.

In the accompanying drawing, which illustrates my invention as applied to the stator windings of an electrical machine, such as a 4-pole single phase motor, Figure 1 is a diagrammatic view of the stator with the windings positioned therein; Figure 2 is a side view of a mold for winding two pole coils; Figure 3 is an end view of the mold shown in Figure 2; Figure 4 is a side view of a mold for winding four pole coils, a modification in the position of the connecting slots also being shown; Figure 5 is a view illustrating the method of shifting the connecting wires when the connecting slots are positioned as shown in Figure 4; Figure 6 is a semi-digrammatic view, in perspective, of a pair of coils after removal from the molds; Figure 7 is a plan view of the coils after reversal to secure alternating polarity; and Figure 8 is a wiring diagram of a stator employing two independent pairs of pole coils.

Referring first to Figures 2 and 3, the numeral 10 represents a base adapted to be secured to the head of a winding lathe by bolts 11. Carried by the base 10 is a central spindle 12 on which is mounted a series of forms 13 separated by sub-coil spacers 14 which project beyond the adjacent forms to provide grooves in which the sub-coils are wound. As shown in these figures, the mold consists of two sets of four forms, each set being arranged in steps of echelon formation and the two sets being reversed, i. e., the two largest forms are situated adjacent each other at the center of the mold. These two large forms are separated by a coil spacer 15. Formed in the coil spacer, as well as in each sub-coil spacer, is a slot 16 to receive the connecting wire extending between the coils and the sub-coils, respectively. The smallest form of the second set is covered by an end plate 17, projecting beyond it to form a winding groove, and this plate is clamped in position by a wing nut 18 on the end of the spindle. Relative rotation between the forms and spacers is prevented by guide rods 19 carried in the base and passing through the holes in the forms and spacers.

To wind a pair of coils on this form it is secured to the head stock of a winding lathe and the wire wound on the outer form until the groove is full, after which the wire is passed through the slot in the adjacent spacer into the next larger groove which is in turn wound full. This is repeated until the four sub-coils forming the first pole coil are wound. It will be noted that in this set of sub-coils a smaller coil is connected to the next larger by a wire 20 extending from the periphery of each sub-coil to the inner side of the next larger sub-coil. The wire is now passed through the slot in coil spacer 15 to form a connection 21 between the two coils, and the second set of sub-coils is wound, the direction of rotation being the same as when winding the first set. In this case, however, the progression being from a larger to a smaller sub-coil, the connecting wires 22 of the set will each extend from the outer side of a larger to the inner side of a smaller coil. To provide the necessary length to the coil connecting wire 21, the coil spacer 15 may be made wider than the other spacers, as shown in Figure 2, or the part of the spacer containing the slot 16 may be extended radially, as shown in Figure 3, or these expedients may be combined.

After the winding of both coils is completed the wing nut 18 is removed and the forms and spacers withdrawn from the spindle to release the coils. The sub-coils of each coil are now moved into the same plane, as shown in Figure 6, to form two coils wound in the same direction and, consequently, having the same polarity. Before applying the coils to the stator it is necessary to reverse the polarity of one coil with respect to the other. This may be done either by placing the two coils upon edge and swinging one to the right through an arc of 90 degrees, and the other to the left through an equal arc, or by placing the coils one upon the other and then swinging the upper coil through an arc of 180 degrees. In either case the result will be two connected coils of opposite polarity, as shown in Figure 7.

Two pairs of coils, such as shown in Figure 7, are adapted to comprise the stator winding of the 4-pole single phase electrical machine illustrated in Figures 1 and 8. The stator core 24 of such a machine may be provided with forty slots and each pole winding may have five sub-coils. I have shown only four sub-coils to each pole winding as it is customary to leave the two center slots of each pole vacant on account of the difficulty of inserting very narrow coils in the slots. As shown, the four coils A, B, C and D are arranged in two circuits to provide for double voltage, coils A and B being in one circuit and coils C and D in another. Coils A and C will, of course, be of one polarity and the coils B and D of the opposite polarity. It will be seen that by my method each winding is continuous, thus not only accomplishing a saving of time in assembling the winding, but resulting in a better and more permanent construction.

In case the four coils are to be included in a single winding, a mold like that shown in Figure 4 is employed. This mold is made by mounting four sets of forms and spacers on the spindle in place of two sets, as above described, and positioning between the two pairs of sets a spacer 23 provided with a slot 16 like the other spacers. The method of winding the coils is the same as with the two coil mold. In Figure 4 I have shown a slight modification, the slots 16 being formed in one of the longer edges of the spacers instead of in one of the short edges, as shown in Figures 2 and 3. When the slots are placed in this position the connecting wires must be shifted to the ends of the coils after the coils are removed from the forms. In Figure 5 I have shown the two outer sub-coils of windings A and B together with their connecting wire 21, the latter being shown in full lines in the initial position and in dotted lines in the shifted position.

While I have shown my invention in connection with a 4-pole machine, it will be understood that the same method may be used for producing the winding or windings of a machine having any desired number of poles. Further, while my method is especially designed for and shown in connection with the stator of an electrical machine, in certain types of machine, it may be applied to the rotor windings as well.

Having fully described my invention, what I claim as new and desire to secure by Letters Patent of the United States is:

1. The method of winding an electrical machine element having a plurality of poles, which comprises winding a pair of pole coils in the same direction from a unitary conductor, reversing one of said coils to produce opposite polarities in the coils of adjacent poles, and applying the winding in integral form to the poles of an electrical machine.

2. The method of winding an electrical machine element having a plurality of poles, which comprises winding a pair of pole coils in the same direction from a unitary conductor, each of said pole coils consisting of a plurality of nestable sub-coils, reversing one of said pole coils to produce opposite polarities in the coils of adjacent poles, and applying the winding in integral form to the poles of an electrical machine.

3. The method of winding an electrical machine element having a plurality of poles, which comprises winding a pair of coils in the same direction from a unitary conductor, relatively rotating said coils in a plane normal to a pair of their axes to produce opposite polarities in the coils of adjacent poles, and applying the winding in integral form to the poles of an electrical machine.

JOSEPH EDWARD PAPIN.